Dec. 11, 1934.  C. A. ALBRECHT  1,983,524
MAGAZINE CHANGING DEVICE FOR TYPOGRAPHICAL
COMPOSING AND DISTRIBUTING MACHINES
Filed June 24, 1933
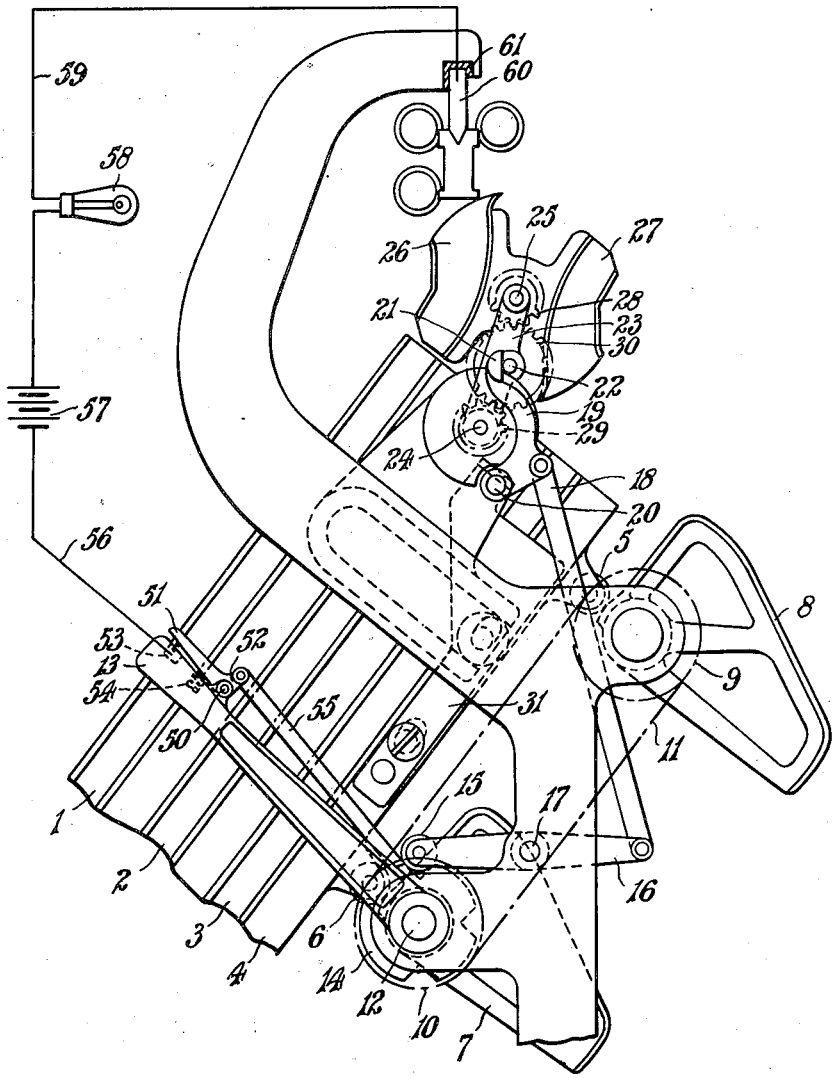
Inventor.
C. A. Albrecht
BY
Morrison, Kennedy & Campbell
ATTORNEYS.

Patented Dec. 11, 1934

1,983,524

UNITED STATES PATENT OFFICE 1,983,524

MAGAZINE-CHANGING DEVICE FOR TYPOGRAPHICAL COMPOSING AND DISTRIBUTING MACHINES

Christian Augustus Albrecht, Berlin, Germany, assignor to Mergenthaler Linotype Company, Brooklyn, N. Y., a company of New York Application June 24, 1933, Serial No. 677,432
In Germany September 10, 1932

6 Claims. (Cl. 199—33)

This invention relates to magazine-changing devices for typographical composing machines such as those known commercially under the registered trade mark "Linotype", and particularly to machines wherein a plurality of magazines are adjusted between the distributing mechanism and the assembling mechanism to bring a desired magazine or magazines of the plurality into operative relationship with said mechanisms. In such arrangements it is necessary to ensure that the distributor is clear of matrices before a contemplated change of magazines is effected to prevent the delivery of matrices to a wrong magazine.

For this purpose, it has already been proposed to close an electrical circuit by means of matrices located on the distributor bar, and thereby to illuminate an optical signal. Before proceeding with the changing of the magazines, the operator must, therefore when such a device is provided, wait until the optical signal is extinguished. This arrangement has the disadvantage that during the normal operation of the machine the optical signal will repeatedly be illuminated and extinguished, even at times when no shifting movement is contemplated, the signal remaining alight so long as matrices are in course of distribution and going out when the distributing operation has been completed. This repeated illumination and extinction of the optical signal disturbs the operator when at work.

The present invention overcomes these disadvantages and constitutes an improvement in the use of an optical or audible signal for the aforesaid purpose. According to the invention a switch for the signal-operating current is provided on the machine, which must be closed prior to making a change of magazines so as to render the signalling device operative only when a change is about to be made. The switch must be mounted at an easily accessible place for the operator, and is preferably connected with a locking device which must be released by the operator before making a change, thus ensuring the closing of the switch at the proper time.

The accompanying drawing illustrates one constructional form of the invention.

In the construction illustrated, three magazines, 1, 2, 3 are provided and are supported by a frame 4. For the purpose of adjusting the frame to bring any desired magazine into operative relationship with the distributor, the frame carries rollers 5, 6, co-operating with cam discs 8, 7. The rotation of the cam discs is effected by sprocket wheels 9, 10 mounted upon the axes of the discs and connected by a chain 11. Upon the shaft 12 of one of the sprocket wheels is mounted a hand lever 13, the rocking of which, through the connections just described, will cause both cam discs to turn and thereby shift the magazine column. Prior to the shifting of the magazines, the magazine entrance connecting the distributor with the magazine must be swung out of the way, or, as in the constructional example illustrated, rotated. For this purpose a cam disc 14 mounted upon the shaft 12 actuates, through a roller 15, a lever 16 turning about a fixed pivot 17, and a link 18 moves a lever 19 pivoted about a stud 20. The lever 19 has a projection 21 adapted to bear against a pin 22 on a lever arm 23 which is pivoted at 24 and carries at its free end a shaft 25 which constitutes the pivotal axis for the two magazine entrances 26 and 27 which may be brought alternatively into the operative position. The rotation of the entrances is effected during the aforesaid swinging movement by means of the gears 28, 29, and 30 and a rack bar located upon a frame 31 adjustable with the magazines. As so far described, the various parts and their mode of operation are or may be of known form.

In carrying out the invention, according to the constructional form illustrated, a stud 50 is mounted on the hand lever 13, on which stud is pivotally mounted a lever 51, 52. The arm 51 of the said lever is formed with a contact point arranged to co-operate with a contact plate 53 mounted on and insulated from the lever 13. A spring 54 holds the contact open. To the arm 52 of the lever, is attached a link 55 which is guided on the lever 13 and at its inner end engages recesses, slots, holes or the like, in the machine frame or in a block or the like located for this purpose on the machine frame, so as to lock the lever 13 against movement, and thus retains the magazines in their adjusted position. The contact 53 is connected with a battery 57 through a lead 56. The lead coming from the battery is connected to an optical signal, such as an incandescent lamp 58, and a lead from the lamp is connected to the distributor bar 60 which, as distinguished from the constructions heretofore proposed, is insulated from the machine frame, for example, by an intermediate insulating member 61. The electrical circuit through the incandescent lamp is closed when the switch is closed while matrices are present on the distributor bar to complete the circuit.

The mode of operation of the device is consequently as follows:—

When the operator wishes to make a change, he will first of all unlock the lever 13, pressing down the arm 51 of the angle lever which he grips simultaneously with the lever 13, thus closing the contact. When the contact is closed and there are still matrices present on the distributor bar, current will pass from the battery 57 through the signal 58, the lead 59, the distributor bar 60, the matrices located on the distributor bar, the machine frame, the lever 51, the contact 53 and the lead 56. The circuit will therefore be closed and the optical signal illuminated. The operator then knows that he should not operate the lever 13 but rather wait until the signal disappears.

In place of the optical signal, which is mounted at any convenient place on the machine frame, preferably in the neighborhood of the keyboard, an audible signal can be employed such as an electric bell.

In the constructional example illustrated, the switch 51—53 is connected with a locking device for the lever 13. In certain cases, however, the locking device can be dispensed with when sufficient certainty exists that the operator, when operating the lever 13, will in all cases also close the switch before he begins a magazine change. On the other hand, the combination of the switch with the lever 13 may also be entirely dispensed with, and the switch mounted in a convenient position for independent operation, for example in close proximity to the keyboard.

Having described my invention, I declare that what I claim and desire to secure by Letters Patent is:—

1. In a typographical composing and distributing machine, the combination of distributing mechanism, a plurality of magazines, magazine-shifting means adapted to bring different magazines alternatively into operative relationship with the distributing mechanism, a normally inactive electrically-operated signalling device adapted to indicate the presence of matrices in the distributing mechanism and a switch operable conjointly with the magazine-shifting means to render the signalling device active.

2. In a typographical composing and distributing machine, the combination of distributing mechanism, a plurality of magazines, magazine-shifting means adapted to bring different magazines alternatively into operative relationship with the distributing mechanism, a locking device adapted to prevent the actuation of the magazine shifting means, a normally inactive electrically-operated signalling device adapted to indicate the presence of matrices in the distributing mechanism, and a switch operable by the release of said locking device to render the signalling device active.

3. In a typographical composing and distributing machine, the combination of distributing mechanism, a hand-lever actuated to change the operative position of the magazines relatively to the distributing mechanism, a normally inactive electrically-operated signalling device adapted to indicate the presence of matrices in the distributing mechanism, and a switch carried by said hand-lever operable to render the signalling device active prior to the actuation of said hand-lever.

4. In a typographical composing and distributing machine, the combination of distributing mechanism, a hand-lever actuated to change the operative position of the magazines relatively to the distributing mechanism, a locking device adapted to prevent the actuation of said hand-lever, a normally inactive electrically-operated signalling device adapted to indicate the presence of matrices in the distributing mechanism, and a switch operated by the release of said locking device to render the signalling device active.

5. In a typographical composing and distributing machine, the combination of distributing mechanism, a plurality of magazines, magazine selecting means operable for connecting one or another of the magazines with the distributing mechanism, a normally inactive electrically-operated signalling device adapted to indicate the presence of matrices in the distributing mechanism, and a switch associated with the magazine selecting means and operable to render the signalling device active preparatory to a change of magazines.

6. In a typographical composing and distributing machine, the combination of distributing mechanism, a plurality of magazines, magazine selecting means operable for connecting one or another of the magazines with the distributing mechanism, a normally inactive electrically-operated signalling device adapted to indicate the presence of matrices in the distributing mechanism, and a switch operable in the act of changing from one magazine to another for rendering the signalling device active.

CHRISTIAN AUGUSTUS ALBRECHT.